US006331143B1

(12) United States Patent
Yoseloff

(10) Patent No.: US 6,331,143 B1
(45) **Date of Patent: *Dec. 18, 2001**

(54) VIDEO NUMBERS GAME

(75) Inventor: Mark L. Yoseloff, South Glastronbury, CT (US)

(73) Assignee: Shuffle Master, Inc., Eden Prairie, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/869,930

(22) Filed: Jun. 5, 1997

(51) Int. Cl.[7] .................................................... A63F 13/00

(52) U.S. Cl. ............................... 463/18; 463/16; 273/269

(58) Field of Search ................................ 463/19, 18, 17, 463/16, 27, 37; 273/85 CP, 85 G, 138 A, 269

(56) References Cited

U.S. PATENT DOCUMENTS

| | | | | |
|---|---|---|---|---|
| 3,770,269 | * | 11/1973 | Elder | 463/18 |
| 4,283,709 | | 8/1981 | Lucero et al. | 463/25 |
| 4,335,809 | | 6/1982 | Wain | 463/20 |
| 4,373,726 | | 2/1983 | Churchill et al. | 463/19 |
| 4,494,197 | | 1/1985 | Troy et al. | 463/18 |
| 4,591,162 | | 5/1986 | Fakhoury | 273/303 |
| 4,665,502 | | 5/1987 | Kreisner | 463/22 |
| 4,695,053 | * | 9/1987 | Vazquez, Jr. et al. | 463/18 |
| 4,836,546 | * | 6/1989 | DiRe et al. | 463/18 |
| 4,842,278 | | 6/1989 | Markowicz | 463/18 |
| 4,858,122 | | 8/1989 | Kreisner | 463/22 |
| 5,112,050 | | 5/1992 | Koza et al. | 463/17 |
| 5,286,023 | * | 2/1994 | Wood | 463/20 |
| 5,342,047 | * | 8/1994 | Heidel et al. | 463/29 |
| 5,380,007 | * | 1/1995 | Travis et al. | 463/18 |
| 5,401,024 | | 3/1995 | Simunek | 273/138 A |
| 5,511,784 | | 4/1996 | Furry et al. | 273/143 R |
| 5,611,729 | * | 3/1997 | Schumacher et al. | 463/18 |
| 5,624,119 | * | 4/1997 | Leake | 273/269 |
| 5,651,735 | * | 7/1997 | Baba | 463/18 |
| 5,727,786 | * | 3/1998 | Weingardt | 273/269 |

OTHER PUBLICATIONS

Pick 3/Pick 4 Rule Sheet from The Maryland State Lottery (Official Site), Oct. 11, 1999 pp. 1–3.

* cited by examiner

*Primary Examiner*—Michael O'Neill
(74) *Attorney, Agent, or Firm*—Jennifer K. Farrar

(57) ABSTRACT

A method of playing electronic video numbers game is disclosed. The method includes the steps of a player placing a wager to participate in the game; the player selecting at least one subset of symbols to play from the original set of symbols; activating a random selection process for picking a second subset of winning symbols from the original set of symbols; and awarding the player a prize if a predefined number of symbols in the subset of symbols played matches the subset to winning symbols. The number of symbols in the subset to play is equal to the number of winning symbols. A video wagering device for playing the numbers game of the present invention is also disclosed.

28 Claims, 7 Drawing Sheets

VIDEO NUMBERS GAME

BACKGROUND OF THE INVENTION

The present invention relates to games of chance. In particular, it relates to a video wagering game and device for playing a video wagering game.

Games which involve the pooling of wagers and the determination of one or more winners based upon the chance selection of numbers go back thousands of years. Large scale, public numbers games have existed for over four hundred years. The first known public numbers game which paid money prizes was La Lotto di Firenze, which began in Florence, Italy, in 1530. The game was soon followed by similar games in Genoa, Venice, and other areas in Italy.

In 1870, when the Italian Republics were consolidated, the games were combined, and the Italian National Lottery was created. In the modern day version of the Italian Lottery, ten sets of five numbers each are drawn from a pool of numbers each week. Each set of numbers is identified by the name of a city in Italy. Players wager on up to five numbers for a particular city. The top prize, which pays 1,000,000 to 1 odds, is awarded for selecting all five numbers correctly for any one city. Smaller prizes are paid for fewer correct numbers.

In the Italian Lottery, a wheel bearing the numbers 1 to 90 is spun to determine the winning outcomes. In presently known daily numbers games, some readily available number is often used as a winning outcome. As an example, the last three digits of the total daily handle at some race track or some predetermined three digits from the total number of shares traded that day on the New York Stock Exchange is used. Lotteries in the United States date back to the early 1800's. At that time, privately owned, government sponsored lotteries flourished with over $66 million wagered in this way in 1832 alone. Prestigious colleges such as Harvard, Yale, Columbia, Brown, and William and Mary used government approved lotteries to raise money for construction and equipment. By the late 1800's, lotteries had fallen out of favor. By this time, most states had passed legislation barring such wagering. Federal laws were also passed forbidding interstate transportation of lottery tickets.

In 1963, New Hampshire was the first state to legalize a modern-day state lottery. Since then, a number of other states have also legalized state lotteries. Interstate lotteries have even come into existence. All of the present state lotteries offer one or two basic game formats. Namely, a daily numbers type game and a weekly lotto type game.

In daily numbers type games, the player wagers on a specific three digit number, typically between 000 and 999. Once a day, a winning number is drawn. Generally, the winning number is selected using a number of sets of ten balls, numbered 0–9 consecutively, with each digit being randomly selected from such a set. Daily numbers type games typically pay 600:1 odds for a correct match. Some variations of the game are conducted using other than three digits. Four digit games are the most popular variation. To win, the player's selection must match the number drawn.

In daily numbers games, several betting options are available. For example, a box bet, a back-up bet, and pair bets are often available in addition to straight bets. In a straight bet, each digit of the number drawn must appear in the order of the number drawn in order to win the game. In a box bet, the digits comprising the numbers are considered individually, and all possible combinations of the digits are part of the wager. For example, if the player wagers on 123 boxed, then he would win if the selected number were any of the following: 123, 132, 213, 231, 312, or 321. Of course, a boxed bet pays less than a straight bet.

A back-up bet is a combination of a straight and box bet, with half of the wager applied to each. If a wager is placed on 123 backed-up and 123 is the winning outcome, then half of the wager would be paid at the straight rate, and half at the boxed rate. If, on the other hand, the winning outcome is 321, then only the backed-up half of the wager would be paid and this would be at the boxed rate.

A pair bet is made on two of the player's three selected digits. For three digits, there are three pairs; namely, the front, split, and back pairs. In the example above, if the player's number is 123, then the front pair wins if the outcome is 12X, where X is any number between zero and nine. The split pair wins if the outcome is 1X3 and the back pair wins if the outcome is X23.

In weekly lotto type games, a set of numbers, generally between 36 and 55 in number, is provided. The player selects a subset of numbers to play, usually five or six, chosen from the set of numbers. Periodically, the winning numbers are drawn. Most commonly, this type of game is played once per week. Generally, the winning numbers are randomly drawn from the original set of numbers (including the numbers in the subset of numbers chosen to play) using a set of numbered balls with each number in the range of possible outcomes appearing on only one ball. To win, some number of the player's selections in the subset must match the numbers drawn. Typically, at least three numbers must match to win a prize. If all of the player's numbers match the outcomes drawn, the player wins a jackpot prize.

The actual play of the numbers games described above is carried out by players purchasing tickets from a number of remote locations. The players may either select their own numbers or permit the ticket dispensing device to automatically generate a subset of numbers chosen to play.

Commonly, up to five subsets of numbers, each subset being printed on a line, can be played at a time and printed on a single ticket. The winning outcomes are typically determined at a location separate from the location where the player placed the wager and take place later in time. Players holding winning tickets can claim their prizes by redeeming the tickets at the place of purchase or with the state lottery commission, depending upon the size of the prize. In order to determine if a player has won a prize, the player must first wait until a period of time sufficient to accumulate a jackpot of a suitable size has gone by, and then must wait until some form of media announces the winning numbers. Typically, this information is conveyed by television broadcast, radio broadcast, in daily newspapers, and via computer networks.

Players who do not take the time to compare their subset of numbers selected to the drawn winning numbers will not collect their prize because they won't know that they won. Since up to a week can elapse from the time a ticket is purchased until the winning numbers are selected, the player may either forget that he purchased a ticket or may misplace it.

All such games have the common element of utilizing a periodic, single central drawing to determine the winning outcomes for an entire jurisdiction. The jackpot must be shared with all players holding winning tickets. The success of the game is dependent upon selling a sufficient number of tickets during the time interval between drawings to fund the winning outcomes. The actual prizes may be either fixed or variable, based on the number of tickets sold. Typically, the daily number type prizes are fixed, while the weekly lotto top prizes are variable.

Lottery games are forms of wagering which have the disadvantages of (1) an extremely low probability of winning; (2) multiple winners and the requirement that winners share the prize; (3) requiring that the player wait for a central drawing; (4) requiring that the player rely on the media to determine if the player has won; (5) placing the burden on the player to come forward at a later date to claim winnings; and (6) having the size of the prize dependent solely upon participation.

In addition to lottery-type games, casino-type number games are known. One example of a popular numbers game is Keno. In the video version of Keno, a set of eighty symbols, numbered 1–80, consecutively, is provided. The player may play up to ten numbers of his or her choice, depending upon the version of the video Keno game being played. The same wager is placed regardless of whether one or ten numbers are played. Consequently, the payout will vary depending upon the size of the subset of numbers being played. Typically the set of numbers from which the subset of numbers to play are drawn includes the numbers 1 through 80. After the subset of numbers chosen to play have been selected, a subset of twenty numbers are randomly drawn from the original set of eighty numbers, including those selected by the player, and compared to the subset of numbers being played. In Keno, the size of the subset of numbers being played is always smaller than the subset of numbers randomly drawn.

It would be desirable to provide a numbers wagering game where the outcome is determined immediately, which provides multiple wagering opportunities, which can be played on a video wagering device in a casino environment and has features that are similar enough to a daily and weekly lottery game to encourage frequent play and provide player excitement.

SUMMARY OF THE INVENTION

The present invention is a method of playing an electronic wagering game. The game is preferably played on an electronic gaming device, such as a video gaming terminal. The gaming device is equipped with a video screen and displays an electronic representation of selected symbols. The method includes the steps of a player placing a wager to participate in the game and selecting at least one subset of chosen symbols to play from a predefined set of symbols. The player selects a subset of x chosen symbols to play, all of which are electronically displayed on a video screen. A random selection process is then activated for identifying a second subset of y winning symbols from the original predefined set of symbols. The winning symbols are also displayed on the video screen. Preferably, the winning set of symbols are video representations of numbered balls. According to the present invention, x and y are integers and are equal in value. Preferably, for a game which is similar in play to a weekly lottery game, x and y are equal to five or six. For a game which is similar in play to a daily game, x and y are equal to 3 or 4.

The subset of symbols chosen to play is then compared to the subset of winning symbols and matches are identified.

The player is then awarded a payout when the predefined number of symbols in the subset of symbols chosen to play matches a predefined number of symbols included in the subset of winning symbols.

DETAILED DESCRIPTION OF THE PREFERRED EMBODIMENTS

Figure 1:
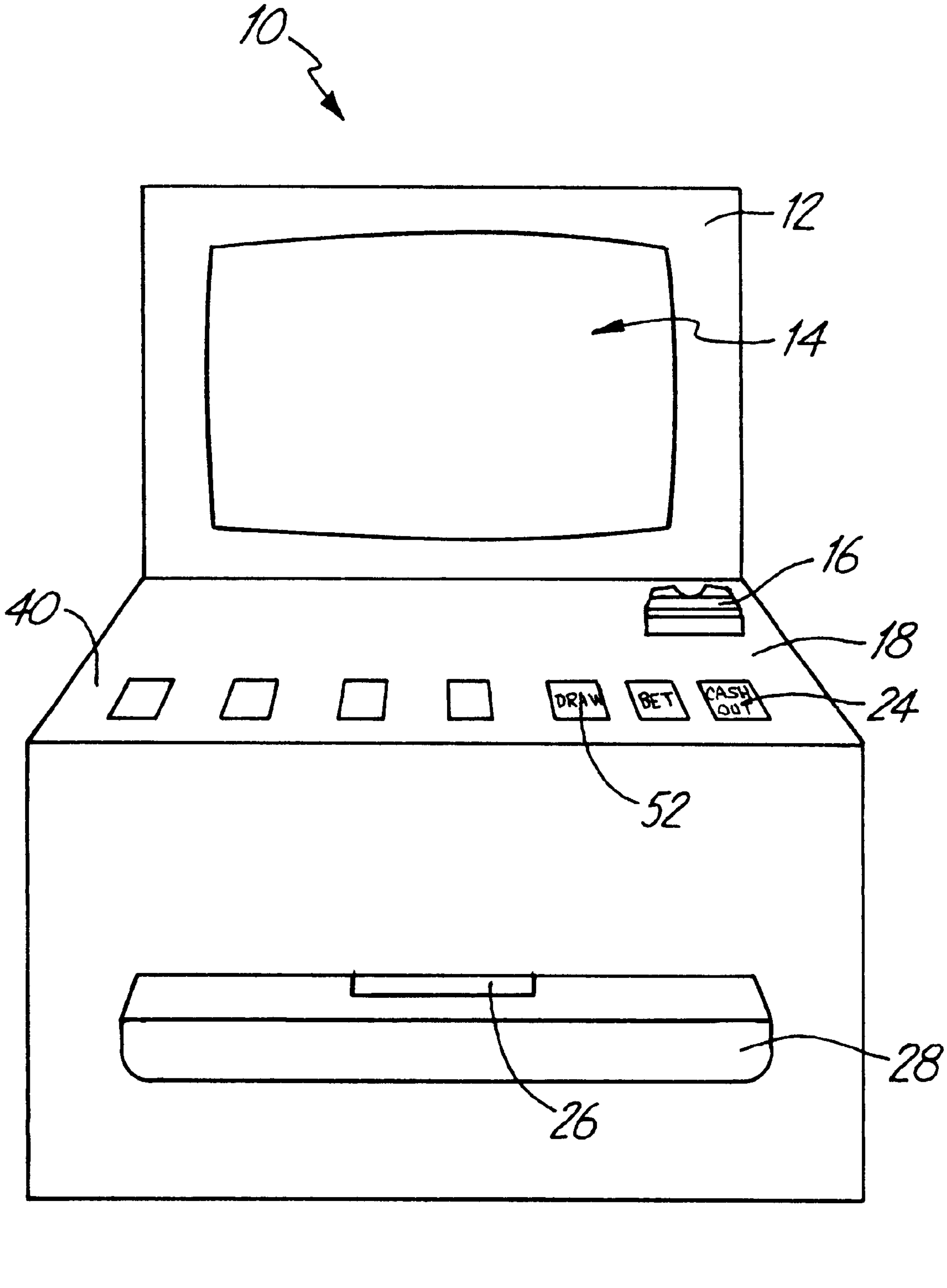
FIG. 1 is a perspective view of the video wagering device of the present invention.

The present invention is a wagering numbers game adapted for play on a casino style video gaming machine such as the device shown at 10 in FIG. 1. The video gaming machine 10 of the present invention includes a cabinet 12, a video screen display 14, a wager acceptor 16, and a plurality of player controls 18. Although the device described below includes touch screen player controls, the present invention contemplates the use of electromechanical player controls to control the play of the game instead of or in addition to touch screen player controls.

In a most preferred embodiment, the video wagering game of the present invention is a simulation of a state lottery game with several important differences. The primary difference is that each video gaming machine in which the game appears, is totally independent of all others in regard to the selection of winning outcomes. This is true regardless of whether all such games are totally independent in terms of their payouts or are electronically linked in order to provide for a progressive payout, as is more fully described below.

A second difference is that in a true state lottery game, all amounts wagered are pooled and the total amount of all winning payouts is determined as a percentage of this total pool. That is, prize amounts are based on the total amount wagered rather than the probability of occurrence. Furthermore, due to the pooled nature of the game, and the fact that a number of participants are vying for portions of the same prize pool, the portion of the pool earmarked for a particular category of winning outcome, for example-matching four out of five numbers, must be shared by all such winners. As a result, if there happens to be one hundred such winners, each would receive only half as much as if there were fifty such winners, even though the nature of each such individual winning outcome has not changed.

In contrast to this, in the most preferred embodiment of the present invention, payout amounts for the basic numbers game are based solely on the probability of occurrence of each winning outcome without consideration for either the amount already wagered in the game or any other occurrence of a similar winning outcome.

In another embodiment, a number of gaming devices are electronically linked, and the wagers from a plurality of gaming devices are pooled to fund a progressive payout. Such an arrangement is referred to in the industry as a wide area progressive (WAP) network. The gaming devices may be located in the same casino or may be located at a plurality of different casinos.

In the progressive form of the game, the amount of the jackpot is initially set at some value based upon the probability of occurrence of the outcome required to win the jackpot and is then increased by adding to it a small percentage of each wager. Although in this regard there is some pooling of wagers, similar to a true state lottery game, winning outcomes are still determined separately and independently by each machine which is included in the progressive link, and there is no possibility of multiple winners and shared prizes.

Further, the sole winner of the game of the present invention is determined by means of an immediate, independent selection of winning combinations of symbols. The player immediately knows that he or she has won a prize because the winning numbers are drawn as soon as the player places his bet and selects the subset of symbols to play.

Figure 2:
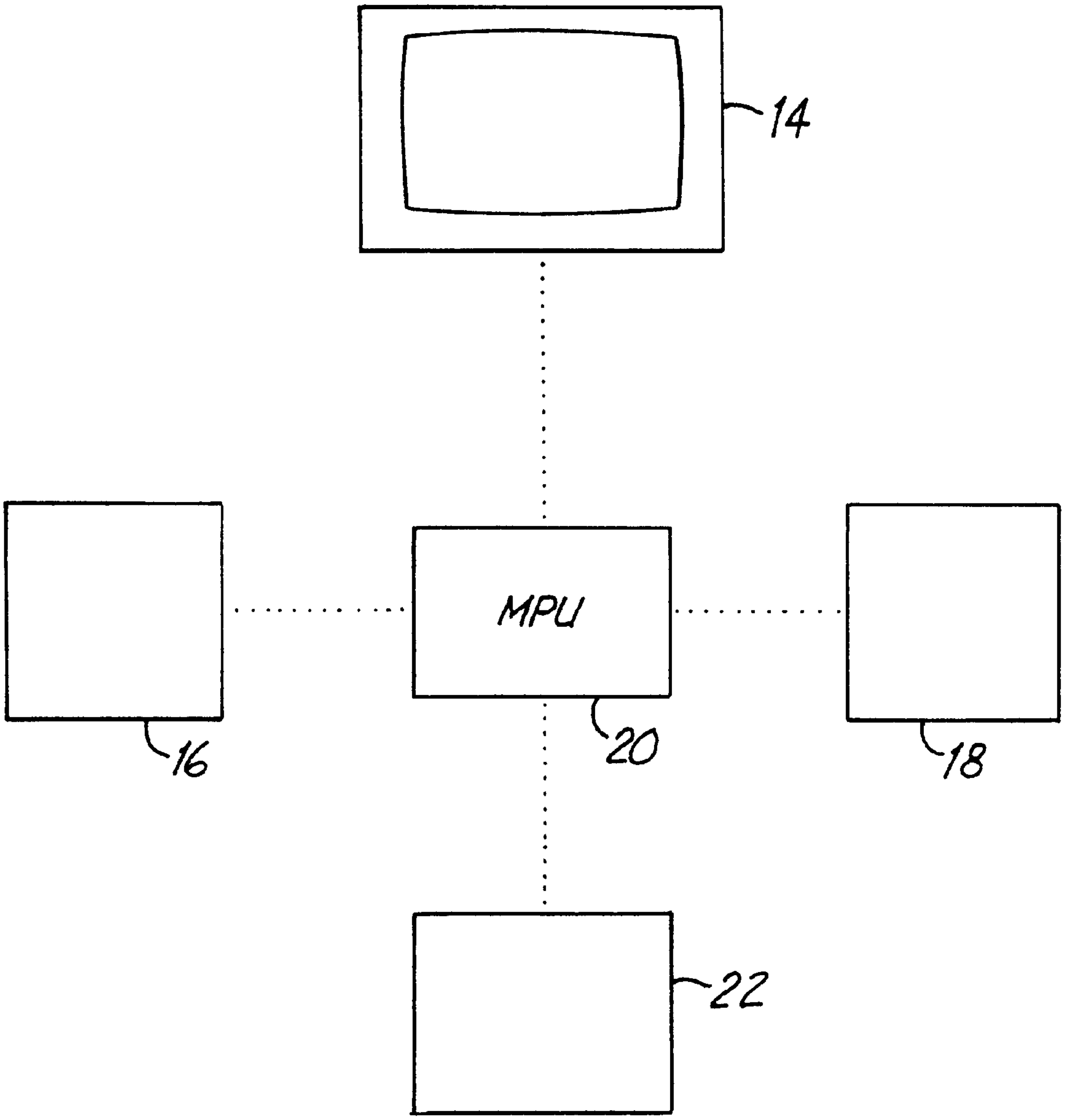
FIG. 2 is a schematic view of the video wagering device of the present invention.

In a first preferred embodiment, the video wagering device 10 includes a microprocessor (MPU) 20 shown schematically in FIG. 2. The microprocessor 20 is electronically coupled to the player controls 18, the video screen display 14, the wager (currency or credit) acceptor 16 and coin dispenser 22. Upon activation of a cash-out button 24 which is preferably incorporated into the player controls 18, a number of coins equal to the number of credits awarded to the player are dispensed through chute 26 into a receiving tray 28.

Figure 3:
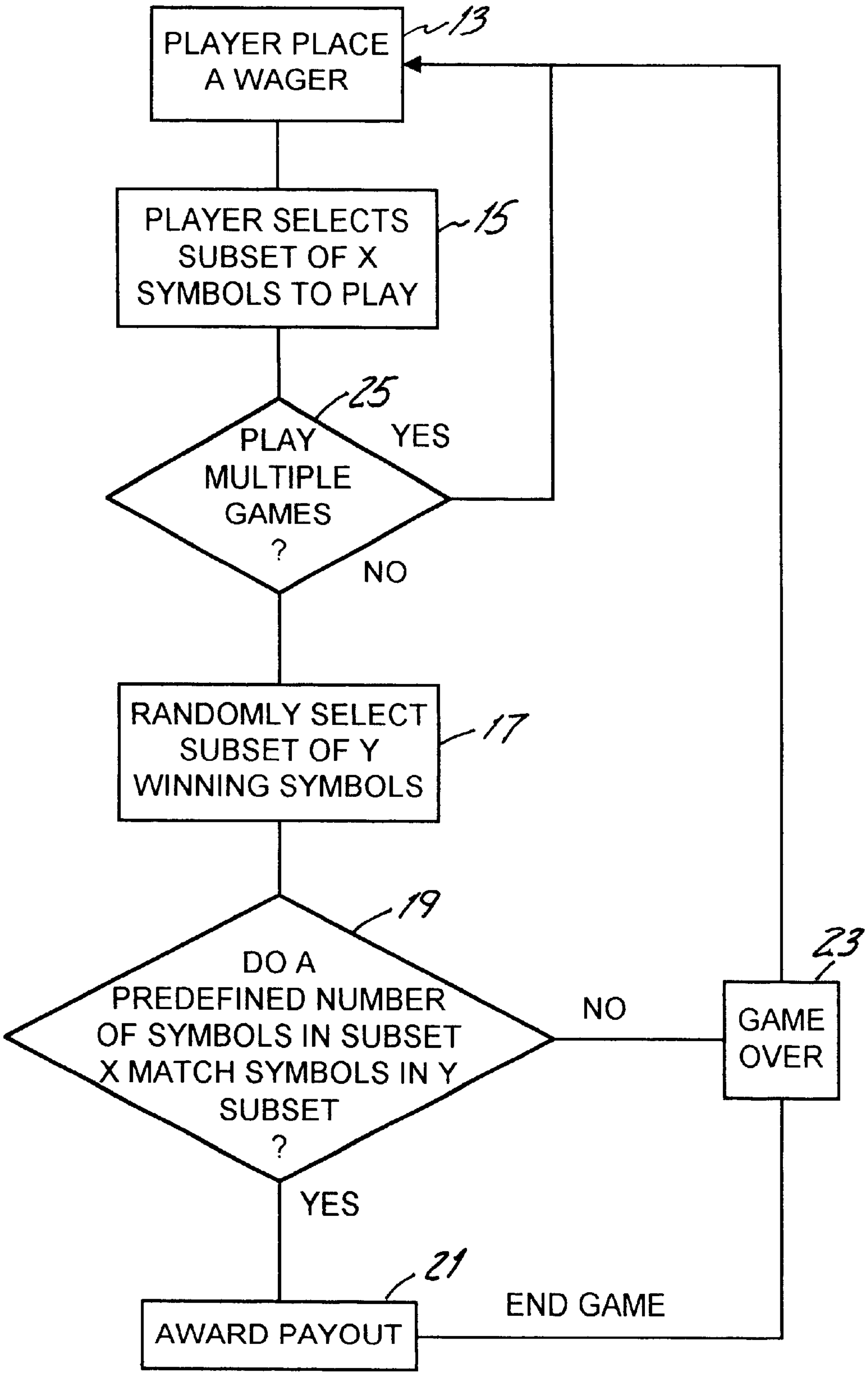
FIG. 3 is a flow diagram of the method of the present invention.

Referring to FIG. 3, a flow diagram of the method of the present invention is shown. The player places a wager 13 to participate in the game. The player then selects 15 a subset of x symbols to play. Either the player identifies the symbols, or the player allows the MPU 20 to randomly "pick" the numbers for the player. Optionally, the player laces additional wagers 25 and selects additional subsets of x symbols to play.

After the subset of x symbols are selected, the MPU 20 randomly selects a subset of y winning symbols 17. The player preferably touches the "draw" area of the touch screen to activate the random selection process 17. Alternatively, the random selection process may be activated by the selection of the last symbol in the fifth and final subset of x symbols.

The MPU 20 compares 19 the set of x symbols to the subset of y symbols to determine if there are any matches. If a pre-selected number of matches occurs, the player receives a payout 21. If no symbols are matched, the game is over 23.

If the player selects a plurality of subsets of x symbols to play, the player preferably places a separate wager for each set of x symbols drawn. Alternatively, the player can play multiple games by selecting multiple sets of x symbols and place only one wager. The payout odds will be decreased to compensate for the higher probability of a winning outcome.

Figure 4:
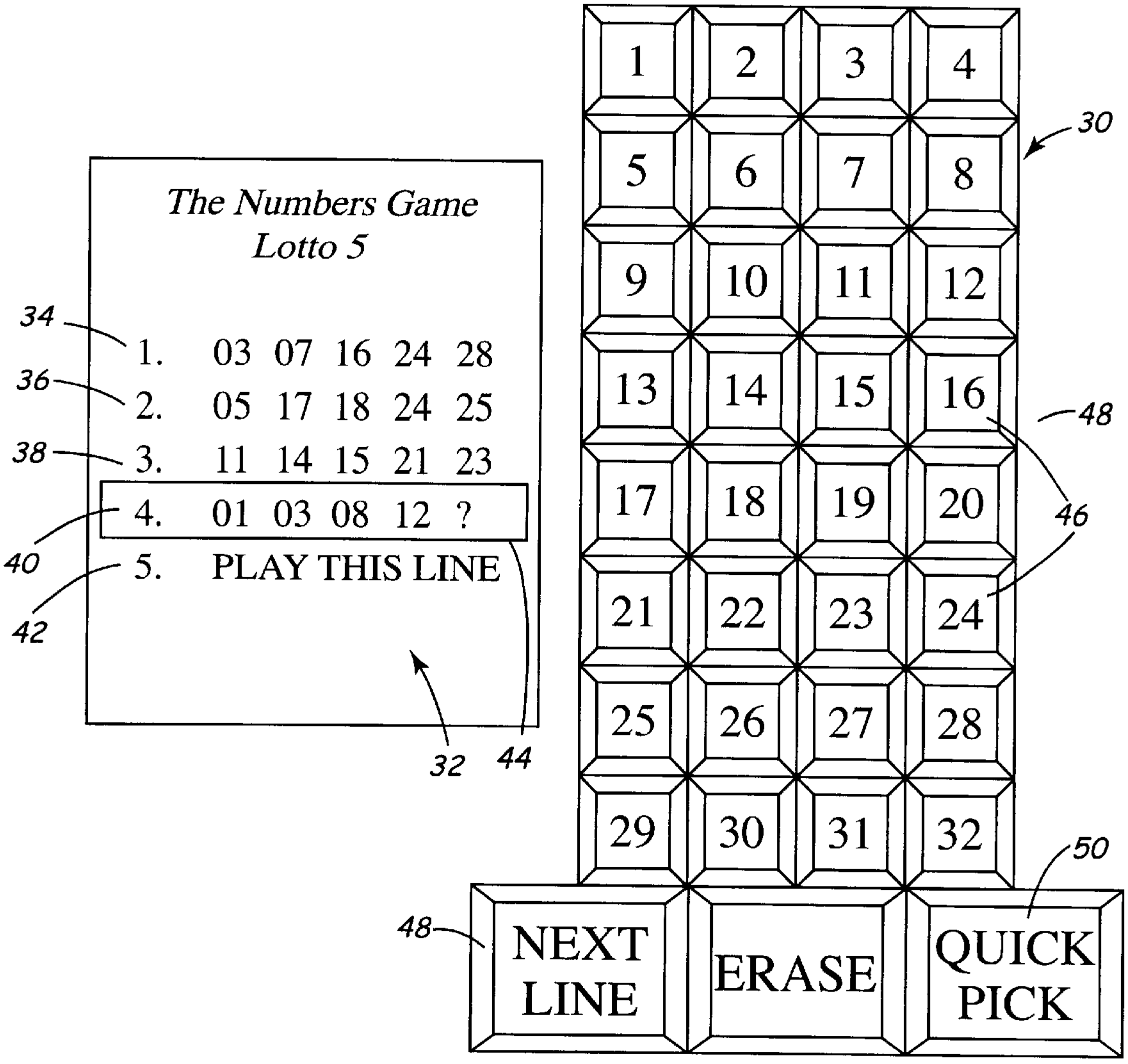
FIG. 4 is a video screen display of a preferred embodiment of the present invention.

In a first preferred embodiment of the game of the present invention, a screen display 30 is provided which includes a visual representation of a lottery ticket 32, as shown in FIG. 4. The ticket 32 includes at least one subset of chosen symbols 34, 36, 38, 40 and 42. In the preferred embodiment the symbols are numbers and the subset consists of a line of five numbers. One to five rows of numbers 34, 36, 38, 40, and 42 are selected. Play begins when the player places a wager in the wager (currency or credit) acceptor 16 (shown in FIG. 1). The player selects one or more subsets of numbers to play. In the preferred embodiment, the player is required to place a separate wager for each subset of symbols selected. In the illustrated example, the player has chosen to play four games by selecting four rows of numbers and placing four separate bets.

The microprocessor 20 is programmed to draw a box 44 around the selected row when the player touches the line on the video display to be played. According to a preferred method of play, the player selects all five numbers. Although the symbols used in the examples of the invention described are numbers, the symbols could be visual representations of objects or letters. For example, cards, animals, geometric shapes, fruit, etc. could be used. The numbers are selected by touching the corresponding number buttons 46 on the touch screen video display 14. Alternatively, player controls 18 could be used to select numbers to play. When the last number in the subset has been identified in the row, the box 44 disappears from the screen display 30. If the player decides to change his number selection, he touches the "erase" button 49 and re-enters new numbers.

If the player chooses to play the first line 34 on the ticket 32, he touches the first line 34 of the screen display. A box 44 appears around the line of numbers 34. Prior to the first game, each line reads "PLAY THIS LINE", as illustrated on the fifth line 42. When subsequent games are played, the last numbers played will reappear on each previously played line. The player is free to play any of the five lines 34, 36, 38, 40, and 42. If the player wishes to play more than one line, he or she selects the next line by touching the screen in the appropriate area, and follows the same procedure outlined above. Preferably, the player is required to place a separate wager for each line played.

If the player chooses to allow the MPU 20 to randomly select the subset of numbers to play, he preferably does so on a line by line basis by first touching the line to be played, causing the box to appear. He then touches the "quick pick" 50 area of the touch screen display 30. The numbers are selected by means of an algorithm which randomly selects the subset of five numbers 34, for example. If numbers appear in the box 44 after the wager has been placed, the player can simply enter five new numbers by depressing the appropriate number 46 on the number display 48 and the new numbers will replace the old numbers.

In an alternative method of play, the player instructs the microprocessor 20 to randomly select the numbers in each subset by manipulating electromechanical player controls 18.

When the number of symbols "x" in the subset is equal to five or six, the game of the present invention has the appearance of simulating a weekly lottery type game, such as the popular Minnesota lottery game, "Powerball®."

According to the most preferred method of play, the set of symbols used to play the game includes video representations of thirty-two numbered balls marked consecutively from one to thirty-two. The number of symbols which comprise the set, the number of symbols per subset and the number of subsets played simultaneously are all factors which determine the preferred payout of the game.

Figure 5:
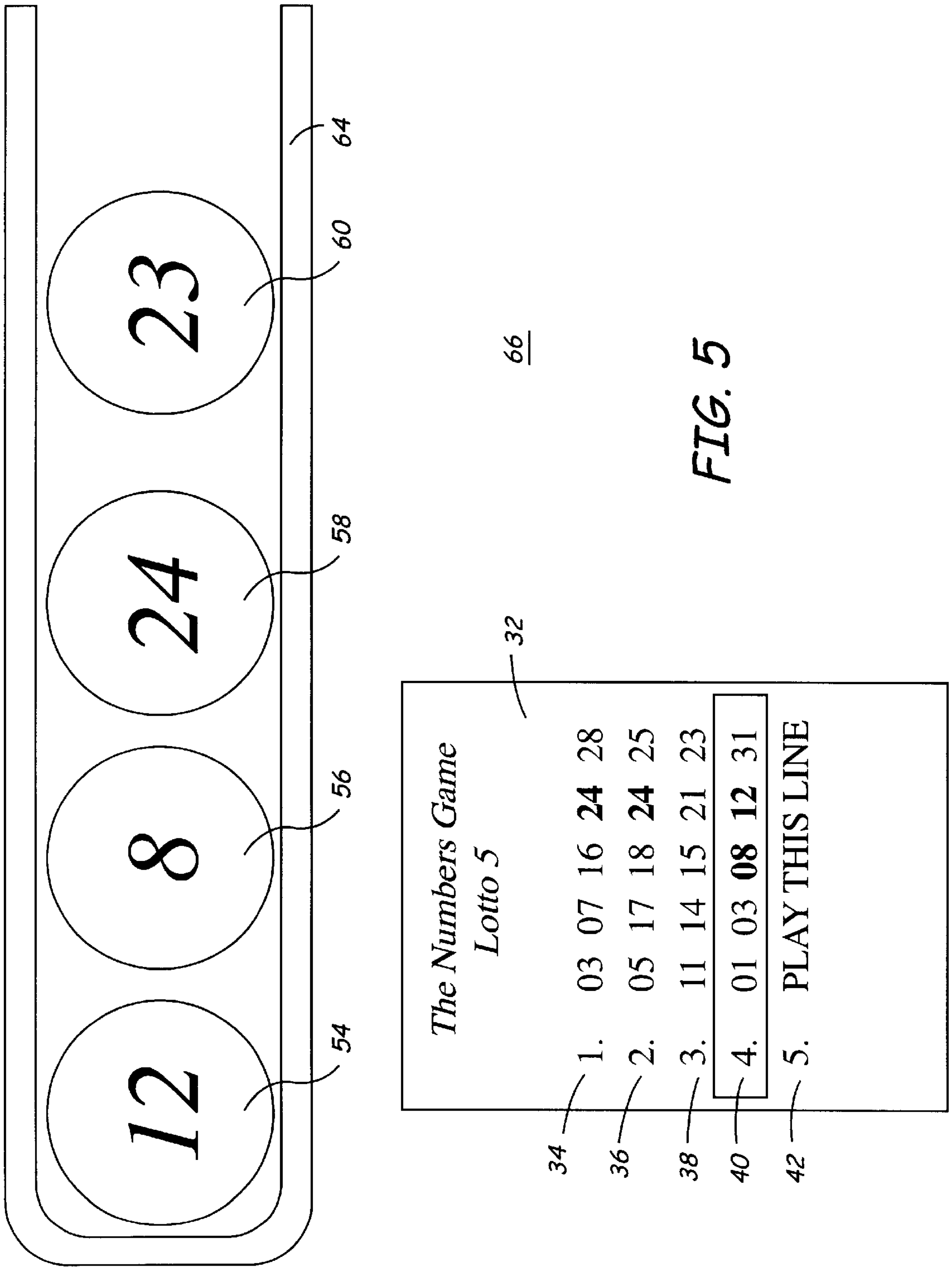
FIG. 5 is a video screen display of a preferred embodiment, illustrating a video simulation of balls being blown into a tube.

FIG. 5 is a graphical representation of the screen display of the five ball game of the present invention. After the numbers to be played in each of lines 34, 36, 38, and 40 are selected, the player touches an area on the screen display which activates the random symbol selection process. Alternatively (as shown in FIG. 1) the player may depress the draw button 52 on the electromechanical player controls 18, which activates the random selection process. In another embodiment, the random selection process is automatically activated as soon as the player provides an indication to the wagering device that his selections are complete. For example, if all five lines, 34, 36, 38, 40, and 42 are simultaneously played, when the last number on the last line is selected, the microprocessor 20 may be programmed to automatically activate the random selection process.

As each number is randomly selected by the MPU 20, a video representation of one of five numbered balls 54, 56, 58, 60, and 62 (shown in FIG. 5) are blown into a tube 64, one at a time, from the upper right hand corner of the screen display 66.

The microprocessor 20 is programmed to compare each number as it is drawn to the numbers appearing on the visual representation of the ticket 32. Preferably, each number in the subset of randomly selected numbers is highlighted in boldface on the video representation of the ticket 32 as the ball appears in the tube.

Figure 6:
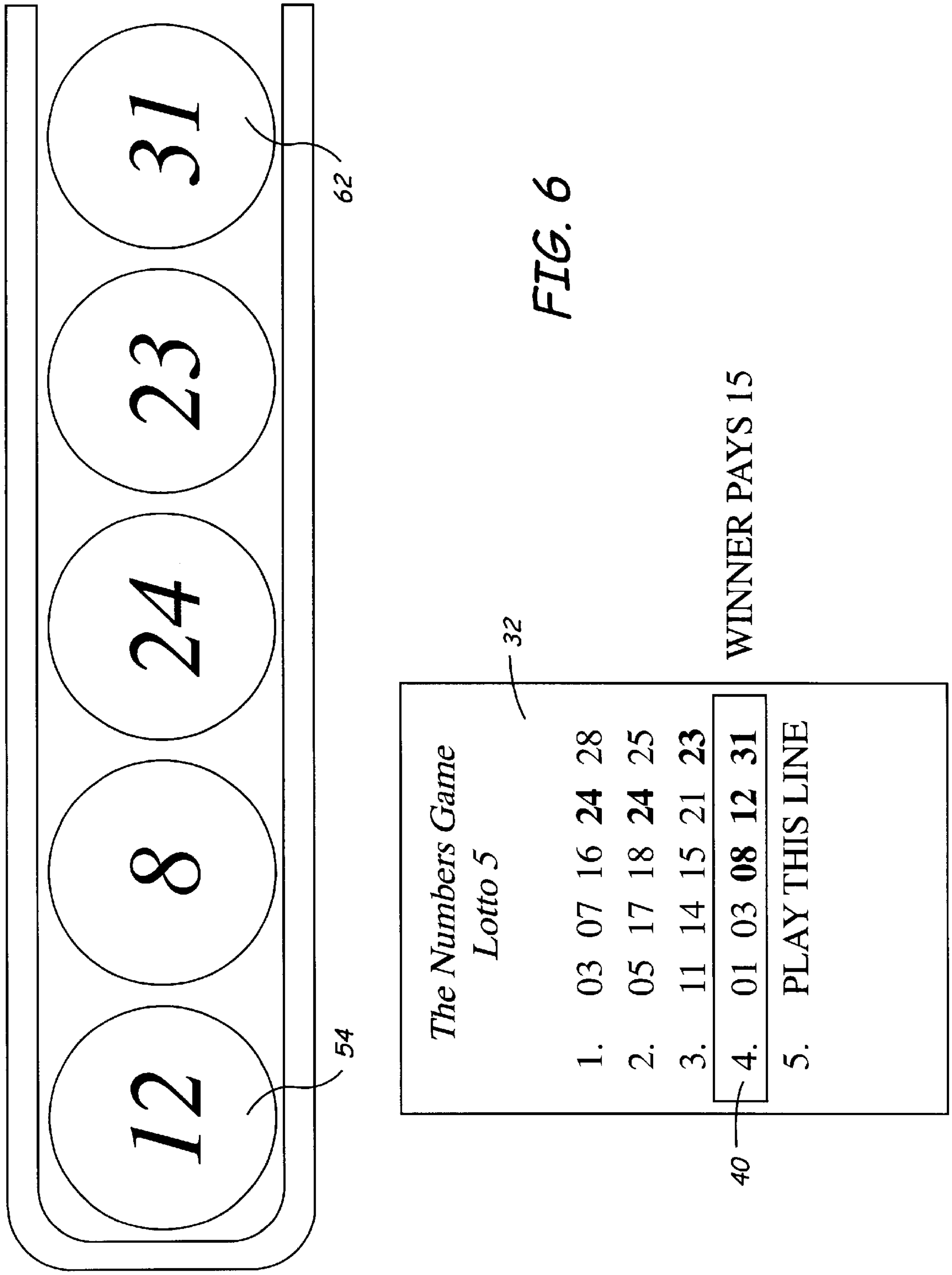
FIG. 6 shows each of the balls of the first preferred embodiment at the conclusion of the random selection process.

As shown in FIG. 6, at the conclusion of the drawing, the microprocessor 20 has highlighted all matching numbers on each line played. The player has matched three out of five numbers on line 40 which corresponds to the fourth game, yielding a payout of 15 for 1.

Although in the first preferred embodiment, the set of symbols includes 32 discrete video representations of consecutively numbered balls, the present invention contemplates providing a set of symbols having fewer or more than thirty-two different symbols in the set. For example, the set used to play the game of the present invention could be video representations of a standard 52 card deck of playing cards.

As seen from the example described above, regardless of the number of subsets of symbols to play selected by the player, a single random selection of symbols determines the outcome of each game played on a single video representation of a lottery ticket 32. In the example described above, the player plays four games simultaneously by placing four separate wagers and selecting four separate sets of five numbers each.

According to the first preferred embodiment, winning amounts are paid according to the following pay table:

| Combination | Payout |
|---|---|
| five matches | 2000 |
| four matches | 100 |
| three matches | 15 |
| two matches | 4 |

Preferably, winning outcomes require at least two matching symbols.

According to the present invention, the player advantageously receives an immediate payout for winning game number four 40. He does not have to wait until the numbers are drawn after a period of time, such as a week, as with weekly lotto games, and does not have to retrace his footsteps and find the location where he purchased the ticket in order to collect his winnings. He is entitled to all of the winnings for that particular draw and is not required by the rules of the game to share the winnings with other players. The present invention contemplates permitting the player to receive an immediate payout as is customary with other casino-type wagering games. The payout the player receives is not dependent upon the amounts wagered by other players, but is based on a statistical analysis of hit frequency.

In the game of the present invention, the predefined set of symbols includes between twenty-five and fifty-five possible choices. This range of choices would correspond to a five or six symbol per subset game. The first preferred embodiment employs 32 numbers in the set for a five ball subset game.

In another variation of the game of the present invention, the predefined set of symbols includes thirty-two balls of two different colors. In one example, three fifths of the balls in the set of thirty-two are white and two-fifths of the balls are red. For a five ball game, the hit frequency of any particular five numbers selected by a player matching the five balls drawn is 1 in 201,276. The frequency of five balls drawn being all white is approximately 1 in 13, and all red is approximately 1 in 98. Combining these numbers provides the following frequency of occurrence of a color combination for a five out of five number match. The frequency of occurrence is:

| Color | Hit Frequency |
|---|---|
| All Red | 1 in 19,665,625 |
| All White | 1 in 2,589,712 |
| Mixed Color | 1 in 220,807 |

Versions of the game of the present invention having similarities to a weekly numbers type game comprising five or six symbols per subset of symbols to play is particularly suited for a multiple gaming device progressive format. Using the numbers above it can be seen that an all red ball, five out of five match could pay a major progressive jackpot; an all white, five of five match could pay a minor progressive jackpot; and a five symbol match of any color combination could pay a fixed value. Any number of other progressive games could be easily developed according to the invention.

In a second preferred embodiment of the present invention, a game which is similar to a daily numbers game is provided. Preferably, a three or four digit number is selected by the player. The predefined set of symbols for a four ball game, for example, consists of numbers consecutively ordered between 0000 and 9999. The number of symbols in the subset is one. That is, a single four digit number is selected by the player and a single four digit number is randomly selected by the microprocessor. As with the weekly type game, a plurality of games can be played on a video representation of a single ticket and a single random selection of numbers determines the outcome of each of the games based on one pick. In this example, unlike the weekly numbers game, individual digits within the selected number can be repeated. For example, the number 1001 could be played. In this example, the 1 and 0 digits each appear twice in the selected number.

As with known daily number lottery type games, the present invention contemplates a payout based on a straight bet, a box bet, positional win or combinations thereof.

For example, the following pay table can be utilized to calculate winnings for a four ball game:

| Bet Type | Pay Out |
|---|---|
| NORMAL | |
| Straight | 960 for 1 |
| Four Way Box | 240 for 1 |
| Six Way Box | 160 for 1 |
| Twelve Way Box | 80 for 1 |
| Twenty-Four Way Box | 40 for 1 |

-continued

| Bet Type | Pay Out |
| --- | --- |
| BACK-UP WINS | |
| Back-up Straight 4 Way Box | 600 for 1 |
| Back-up Straight 6 Way Box | 560 for 1 |
| Back-up Straight 12 Way Box | 520 for 1 |
| Back-up Straight 24 Way Box | 500 for 1 |
| Back-up 4 Way Box | 120 for 1 |
| Back-up 6 Way Box | 80 for 1 |
| Back-up 12 Way Box | 40 for 1 |
| Back-up 24 Way Box | 20 for 1 |
| POSITIONAL WINS | |
| Any 3 | 18 for 1 |
| Any 2 | 8 for 1 |
| Right Position | 5 for 1 |

Figure 7:
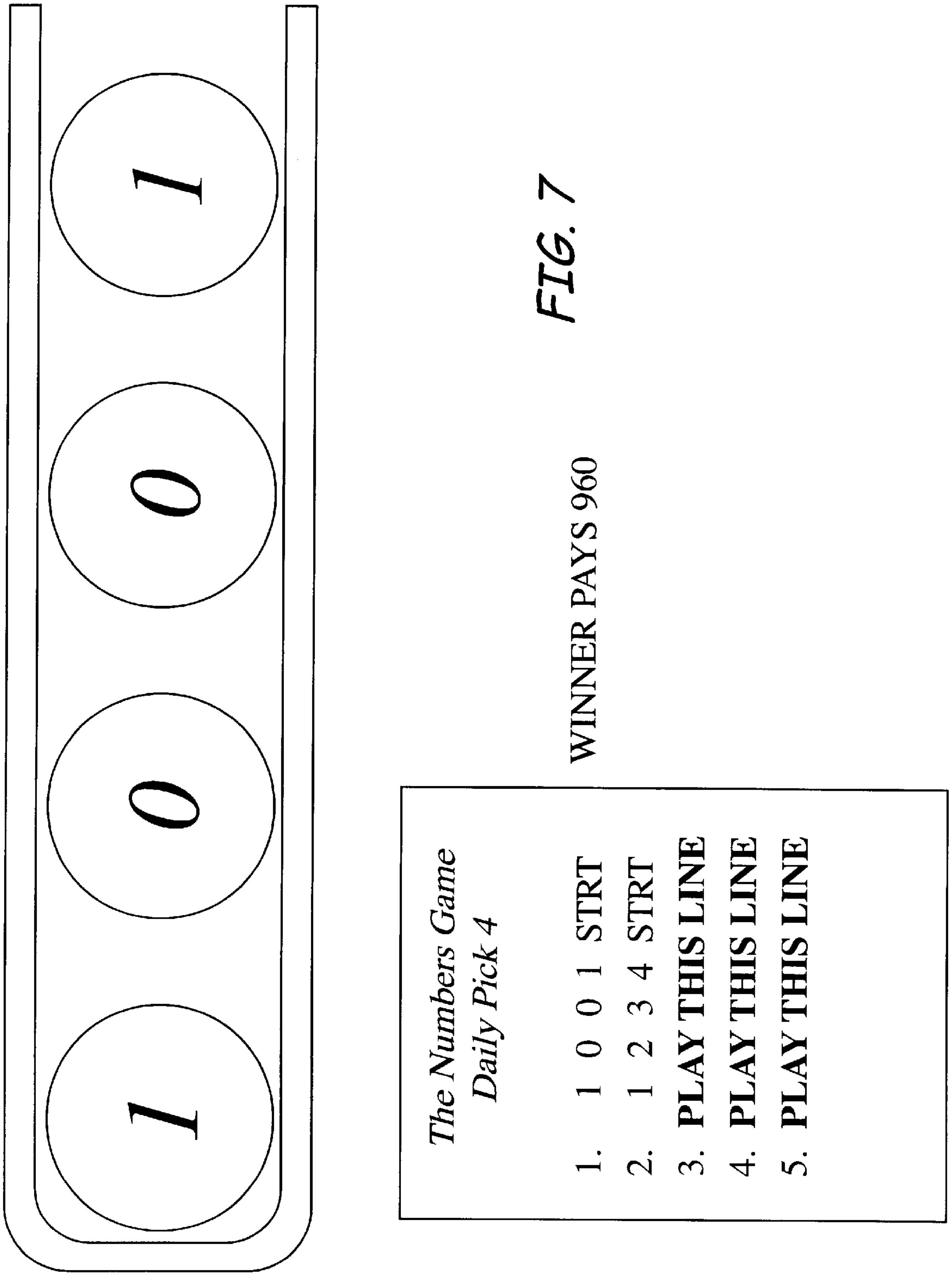
FIG. 7 shows each of the balls of the second preferred embodiment at the conclusion of the random selection process.

As shown in FIG. 7, the number 1001 was randomly selected and pays the player 960 for 1.

The present invention contemplates using one or more types of symbols to alter the odds and allow for progressive versions of the game. For example, the four ball example of the present invention could be played with two different ball colors in the set. Alternatively, a much larger set of one type of symbols could also be used.

In a progressive version of the game of the present invention, a plurality of gaming devices are electronically linked either within a single location or between several locations. The winnings from the linked devices are used to fund a progressive jackpot. In the example described above, a two color five ball game consisting of a set of thirty-two numbered balls would be used to provide a hit frequency which would allow for a significant accumulation of pooled funds to fund a progressive jackpot.

As the number of symbols in the set is increased, and for a given size subset x=1, the probability of receiving a winning line decreases. For this reason, it is desirable to select set sizes which are large in number when the game has a progressive payout feature.

Although the present invention has been described with reference to preferred embodiments, workers skilled in the art will recognize that changes may be made in form and detail without departing from the spirit and scope of the invention.

What is claimed is:

1. A method of playing an electronic wagering game on a gaming device that generates electronic representations of symbols, and includes a video screen for displaying selected symbols from a predefined set of game symbols, comprising the steps of:

a player placing a wager to participate in the game;

selecting at least one first subset of symbols chosen to play from the predefined set of game symbols, wherein the first subset of game symbols chosen to play consists of x symbols and wherein only the first subset of symbols and not the entire predefined set of game symbols is electronically displayed on a video screen;

activating a random selection process for identifying a second subset of y symbols from the predefined set of game symbols, wherein the second subset of symbols are also displayed on the video screen, wherein x and y are integers of equal value, and wherein each symbol in the first and second subsets are selected from the complete set of predefined game symbols; and awarding the player an immediate payout when a predefined number of symbols in the first subset of symbols matches a predefined number of symbols included in the second subset of symbols.

2. The method of claim 1, wherein the predefined set of game symbols includes at least two types of symbols.

3. The method of claim 2, wherein the types of symbols comprise at least two colors.

4. The method of claim 1, wherein x and y are of a value between 3 and 6.

5. The method of claim 1 wherein x and y are equal to five.

6. The method of claim 1 wherein x and y are equal to four.

7. The method of claim 1, wherein a plurality of gaming devices are electronically linked, and at least a portion of the wagers placed in each gaming device are used to fund a progressive jackpot.

8. The method of claim 1, wherein a number of symbols in the predefined set of game symbols is equal to 32.

9. The method of claim 1, wherein the set of symbols consists of the numbers from 0000 to 9999.

10. The method of claim 1, wherein the symbols comprise video representations of numbered balls.

11. The method of claim 1, wherein the winning symbols are displayed as video representations of a plurality of numbered balls that have been blown into a tube.

12. The method of claim 1, wherein the symbols comprise numbers, and a plurality of first subsets of numbers are selected by a player prior to the activation step.

13. The method of claim 12, wherein one wager is placed for each first subset of symbols played.

14. A video wagering device comprising:

a video game terminal with a video monitor, a microprocessor programed to display and control play of a video wagering game, player controls capable of sending electronic signals to the microprocessor, and an acceptor for accepting a wager, wherein the microprocessor is programmed to:

permit a player to select x symbols defining a first subset of symbols to play from a predefined set of game symbols;

display only the first subset of symbols and not the entire predefined set of game symbols;

randomly select and display a second subset of y symbols in response to a player manipulating player controls, wherein the second subset of symbols is selected from the complete predefined set of game symbols; and pay the player an immediate payout if a predetermined number of symbols in the first subset of symbols to be played matches symbols in the second subset of symbols, wherein x and y are integers of equal value.

15. The device of claim 14, and further comprising touch screen controls for sending electronic signals to the microprocessor.

16. The method of claim 1, wherein the payouts are based on a straight bet, box bet, positional bet and back-up bet.

17. The method of claim 1, wherein the predefined set of symbols comprises two or more types.

18. The method of claim 1, wherein the predefined set of symbols consists of 32 numbered balls, and wherein the first type is a first color and the second type is a second color.

19. A method of playing an electronic wagering game on a gaming device which generates electronic representations of numbered balls, and includes a video screen for displaying selected numbered balls, comprising the steps of:

a player placing a wager to participate in the game;

selecting at least one first subset of five numbers chosen to play from a predefined set of thirty two numbers, wherein only the selected subset of numbers and not the entire predefined set of numbers is electronically displayed on a video screen;

activating a random selection process for identifying a second subset of 5 numbers from the complete predefined set of numbers, wherein only the second subset of numbers and not the complete predefined set of 32 numbers are also displayed on the video screen; and awarding the player an immediate payout when at least two numbers in the first subset of numbers matches at least two numbers included in the second subset of numbers.

20. The method of claim 1 wherein each symbol in the predefined set of game symbols is different from the remaining symbols in the predefined set of game symbols.

21. The method of claim 1 wherein the selection of the first subset of symbols is made by means of a random selection process.

22. The method of claim 1 wherein the selection of the first subset of symbols is made by the player.

23. The apparatus of claim 14 wherein the selection of the first subset of symbols is made by means of a random selection process.

24. The apparatus of claim 14 wherein the selection of the first subset of symbols is made by the player.

25. The method of claim 1, wherein the number of matching symbols is at least two.

26. A method of playing an electronic wagering game on a gaming device that generates electronic representations of symbols, and includes a video screen for displaying selected symbols from a predefined set of game symbols, comprising the steps of:

a player placing a wager to participate in the game;

selecting at least one first subset of symbols chosen to play from the predefined set of game symbols wherein the set comprises at least two types of game symbols, wherein the first subset of game symbols chosen to play consists of x symbols and wherein the first subset of symbols and not the entire predefined set of game symbols is electronically displayed on a video screen;

activating a random selection process for identifying a second subset of y symbols from the predefined set of game symbols, wherein the second set of symbols are also displayed on the video screen, wherein x and y are integers of equal value, and wherein each symbol in the first and second subsets are selected from the complete set of predefined game symbols; and awarding the player an immediate payout when a predefined number of symbols in the first subset of symbols matches a predefined number of symbols included in the second subset of symbols.

27. The method of claim 1, wherein the predefined set of game symbols consists of two types of symbols.

28. The method of claim 1, wherein the types of game symbols includes two colors.

* * * * *